US008260704B1

(12) United States Patent
Hung et al.

(10) Patent No.: US 8,260,704 B1
(45) Date of Patent: *Sep. 4, 2012

(54) METHODS AND SYSTEMS FOR MANAGING CONSUMER TRANSACTIONAL ACCOUNTS

(75) Inventors: Kevin K. Hung, Forest Hills, NY (US); Susan R. Moon, Manhasset, NY (US); Eric H. Yellin, Cambridge, MA (US); Alice C. Yu, Brooklyn, NY (US)

(73) Assignee: Citicorp Credit Services, Inc., Long Island City, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/570,766

(22) Filed: Sep. 30, 2009

Related U.S. Application Data

(63) Continuation of application No. 11/169,526, filed on Jun. 29, 2005, now Pat. No. 7,689,507.

(60) Provisional application No. 60/583,726, filed on Jun. 29, 2004.

(51) Int. Cl.
*G06Q 40/00* (2006.01)
(52) U.S. Cl. .......................... 705/39; 705/40
(58) Field of Classification Search ............. 705/39–42, 705/14; 235/379–381
See application file for complete search history.

(56) References Cited

U.S. PATENT DOCUMENTS

| | | | | |
|---|---|---|---|---|
| 5,569,897 A | * | 10/1996 | Masuda | 235/379 |
| 5,724,523 A | * | 3/1998 | Longfield | 705/35 |
| 5,883,452 A | * | 3/1999 | Masuda | 235/380 |
| 5,950,179 A | * | 9/1999 | Buchanan et al. | 705/38 |
| 6,144,948 A | * | 11/2000 | Walker et al. | 705/38 |
| 6,158,657 A | * | 12/2000 | Hall et al. | 235/380 |
| 6,494,365 B1 | * | 12/2002 | Kozakai et al. | 235/380 |
| 6,877,656 B1 | | 4/2005 | Jaros et al. | 235/380 |
| 6,980,969 B1 | | 12/2005 | Tuchler et al. | 705/39 |
| 2001/0034720 A1 | | 10/2001 | Armes | 705/65 |
| 2002/0023023 A1 | | 2/2002 | Borecki et al. | 705/26 |
| 2003/0182247 A1 | * | 9/2003 | Mobed et al. | 705/78 |
| 2004/0158532 A1 | | 8/2004 | Breck et al. | 705/74 |

OTHER PUBLICATIONS

E-cash, temporary credit cards online shopping options :[Home Edition]. (Nov. 22, 2000,). Daily Breeze,p. E1.*
International Search Report for Application No. PCT/US05/22888, 2 pp., datead Jan. 10, 2007.
Written Opinion for Application No. PCT/US05/22888, 3 pp., dated Jan. 10, 2007.

\* cited by examiner

*Primary Examiner* — Hani M Kazimi
(74) *Attorney, Agent, or Firm* — Johnson, Marcou & Isaacs, LLC; John M. Harrington

(57) ABSTRACT

Computer-implemented methods and systems for managing consumer transactional accounts provides a temporary line of credit with an installment option that a consumer can use for specific occasions or life events. The account remains open for only a limited period of time during which interest does not accrue. Thereafter, the account automatically expires, interest begins to accrue on the amount charged on the account, and an invoice is sent to the consumer with a number of payment options.

25 Claims, 3 Drawing Sheets

PAYMENT OPTIONS

| | |
|---|---|
| 20 | Allowing the consumer to pay the principal balance of the invoice in full with no interest charged on the principal |
| 22 | Allowing the consumer to elect to pay the principal balance in installments |
| 24 | Allowing the consumer to authorize the financial institution to draft the consumer's checking account through an ACH payment |
| 26 | Storing the consumer's checking account information by the financial institution for debiting the consumer's checking account for payment of succeeding charges |
| 28 | Allowing a consumer who has an existing financial institution credit card to have the consumer's temporary transactional account charges rolled over into the consumer's existing financial institution credit card account |
| 30 | Converting the temporary transactional account into a new, permanent credit card account |
| 32 | Allowing the consumer to pay the balance of the temporary transaction account in fixed installments within a pre-specified period of time either in full or via revolving credit |
| 34 | Allowing the consumer to elect to pay a portion of the balance of the temporary transaction account and roll the remainder over to the consumer's existing credit card account with the financial institution |

FIG. 2

PROMOTIONS

| |
|---|
| 40 — Agreeing to encourage consumers to use their temporary transactional accounts to shop with a particular merchant in return for the merchant's agreement to provide discounts to consumers who shop with a temporary transactional account access device imprinted with the merchant's logo or insignia |
| 42 — Assigning merchant-specific promotions to specifically issued temporary transactional account access devices via printing on the access devices |
| 44 — Adding promotions or discounts to pre-determined temporary transactional account access devices based on targeting criteria specified by a merchant or bank |
| 46 — Adding promotions or discounts to pre-determined temporary transactional account access devices based random assignment as a type of prize for the consumer |
| 48 — Providing exploding coupons with dynamic pricing in which consumers are offered a discount by the financial institution and/or one or more of the merchants on all purchases made with pre-determined temporary transactional account access devices within a certain communicated pre-determined time frame |

FIG. 3

METHODS AND SYSTEMS FOR MANAGING CONSUMER TRANSACTIONAL ACCOUNTS

PRIORITY APPLICATION

This application is a continuation of application Ser. No. 11/169,526, filed Jun. 29, 2005 now U.S. Pat. No. 7,689,507, entitled "METHODS AND SYSTEMS FOR MANAGING CONSUMER TRANSACTIONAL ACCOUNTS", which claims the benefit of U.S. Provisional Application No. 60/583,726, filed Jun. 29, 2004, entitled "METHODS AND SYSTEMS FOR MANAGING CUSTOMER TRANSACTIONAL ACCOUNTS", each of which is incorporated herein by this reference.

FIELD OF THE INVENTION

The present invention relates generally to the field of consumer credit, and more particularly to methods and systems for managing consumer transactional accounts.

BACKGROUND OF THE INVENTION

Currently, consumer research indicates that, faced with a flood of choices in the marketplace, there is a growing trend among consumers to be reluctant to commit to any particular product or service with any degree of long-term loyalty. That trend is evidenced among consumers who, when faced with an excess of payment vehicle choices, elect to use a number of different existing payment vehicles to create their own somewhat intricate patchwork payment system consisting, for example, of various transaction card products, cash, and "white envelopes" to maintain their personal finances and control their spending and budgeting.

Thus, consumers have a tendency to "bucket" their spending by applying for one specific transaction card which they dedicate, for example, to spending for gasoline and the like and another which they use only for buying groceries and the like. Even consumers who use cash have a tendency to separate their cash into "white envelopes", for example, with their grocery money in one envelope, their entertainment money in another envelope, and so forth.

As noted above, this current trend is by no means limited to payment vehicles and personal finances, and consumers have become increasingly reluctant to commit to practically any products or services. In response to the current trend, companies currently offer no-commitment, risk-free trials of products, such as single music recordings instead of entire CDs, single magazine articles instead of the entire magazine, and small sized portions or quantities of other products, in hopes of upgrading consumers to full-sized products.

There is a present need for a financial product that addresses the current trend of consumers to create their own patchwork personal finance system and that provides a solution that allows consumers to bucket and control their spending, while assuring them of best price/financing and predictable monthly payments, and simultaneously not requiring customers to enter into a long-term commitment/relationship with the service provider.

SUMMARY OF THE INVENTION

It is a feature and advantage of the present invention to provide methods and systems for managing consumer transactional accounts that enables consumers to continue to create their own personal finance systems, combining their creativity with individual aspects of payment products currently available.

It is another feature and advantage of the present invention to provide methods and systems for managing consumer transactional accounts that enables consumers to segment and simplify spending related to life events and specific occasions without the necessity of committing to a new transactional account.

It is a further feature and advantage of the present invention to provide methods and systems for managing consumer transactional accounts that offer consumers one complete product solution which enables them to better manage their spending instead of creating a patchwork system comprised of currently available payment products.

It is an additional feature and advantage of the present invention to provide methods and systems for managing consumer transactional accounts that enables consumers to keep certain expenses separate from the medley of other expenses normally included on a consumer's existing transactional account.

It is still another feature and advantage of the present invention to provide methods and systems for managing consumer transactional accounts that allows consumers to lock in pricing for a basket of purchases and simplifies a consumer's tracking and budgeting of all expenses related to a significant event in his or her life.

To achieve the stated and other features, advantages and objects, embodiments of the present invention provide methods and systems for managing consumer transactional accounts which involve, for example, a temporary line of credit with an installment option that consumers can use for specific occasions or life events. The account remains open for only a limited period of time during which interest does not accrue. Thereafter, the account automatically expires, interest begins to accrue on the amount charged on the account, and an invoice is sent to the consumer with a number of payment options.

In particular, embodiments of the invention provide computer-implemented methods and systems for managing consumer transactional accounts in which consumer information is received by a financial institution in connection with a request for a temporary transactional account for the consumer, the temporary transactional account is approved for the consumer real time by the financial institution, and a temporary transactional account access device is provided real time for the consumer. Thereafter, the consumer is allowed to incur charges over a pre-determined period of time on the temporary transactional account using the temporary transactional account access device, and upon expiry of the pre-determined period of time, the consumer is provided with multiple options for payment of the charges incurred on the temporary transactional account.

In embodiments of the invention, the consumer information is entered by the consumer on a keyboard component of a kiosk or by reading relevant consumer data from a magnetic stripe-equipped driver's license or a bar code-equipped driver's license dipped in a card reader component of the kiosk. Another aspect of the invention involves, for example, receiving consumer identification information that links the consumer who is an existing customer of a financial institution back into the financial institution database for identification purposes.

The process of approving the temporary transactional account for embodiments of the invention by the financial institution involves, for example, performing a real time risk assessment and risk profiling of the consumer by the financial institution and/or performing a real time verification of the consumer who is an existing customer of the financial institution automatically by a backend system of the financial institution.

In embodiments of the invention, the temporary transactional account access device is issued with a temporary line of credit for the consumer. The temporary transactional account access device can be either a physical access device or a non-physical access device. Further, the physical access device can be, for example, a temporary transaction card issued via the kiosk, and the consumer can be provided various options to customize the temporary transaction card real time at the kiosk.

Customization options for the temporary transaction card at the kiosk can include, for example, an option to customize the appearance of the temporary transaction card by choosing from at least one of text, graphic artwork, and photo capture capabilities on the kiosk, an option to personalize the temporary transaction card with at least one of the cardholder's name, account number, and card expiration date, and an option to dedicate the temporary transaction card solely to a pre-selected spending category. Another aspect of embodiments of the invention involves, for example, issuing an inactive temporary card real time that can be activated for use by the consumer at a later time.

In still another aspect of the invention, instead of a physical temporary transactional account access device, the consumer can be provided a non-physical temporary transactional account access device real time consisting one or more of a numeric designation, an alphanumeric designation, a pseudo-credit card number that can be processed through a card issuer's card processing system, a private label type account number limited to at least one private label merchant consumer of the financial institution, and/or an account number implemented for use for a consortium of merchants.

In embodiments of the invention, the consumer is allowed to incur charges on which no interest accrues on the temporary transactional account during the pre-determined period of time, and upon expiry of the pre-determined period of time, the temporary transactional account is automatically closed and interest automatically commences to accrue on the incurred charges.

Upon closing the temporary transactional account, an invoice is sent to the consumer by the financial institution with multiple payment options. The payment options include, for example, an option that allows the consumer to pay the principal balance of the invoice in full with no interest charged on the principal, an option that allows the consumer to elect to pay the principal balance in installments over time, such as three months, six months or twelve months plus interest, or an option that allows the consumer to authorize the financial institution to draft the consumer's checking account, e.g., through an ACH payment.

Other payment options include, for example, an option in which the financial institution stores the consumer's checking account information for debiting the consumer's checking account for payment of succeeding charges, an option for a consumer who has an existing financial institution credit card to have the consumer's temporary transactional account charges rolled over into the consumer's existing financial institution credit card account, and/or an option in which the temporary transactional account is converted into a new, permanent credit card account.

Further payment options include, for example, an option that allows the consumer to pay the balance of the temporary transaction account in fixed installments within a pre-specified period of time to pay either in full or via revolving credit and/or an option that allows the consumer to elect to pay a portion of the balance of the temporary transaction account and roll the remainder over to the consumer's existing credit card account with the financial institution. Alternatively, a consumer who opens a temporary transactional account for a limited duration can choose to treat it more like a revolving credit account where there is a specified balance by which the consumer pays each month, and when the account is closed at the close of the limited duration period, the remaining balance is not actually transferred to a new account (i.e., rolled over), but instead the consumer can continue to actually just pay down that balance until it reaches zero.

For the option that allows the consumer to elect to pay a portion of the balance of the temporary transaction account and roll the remainder over to the consumer's existing credit card account, the consumer is given further options, for example, to have a portion of the balance of the temporary transaction account that is rolled over to the credit card account as a cash advance in the credit card account and/or to have a portion of the balance of the temporary transaction account that is rolled over to the credit card account as a purchase in the credit card account.

Embodiments of the invention also involve providing promotions in connection with the temporary transactional account access device, such as the financial institution agreeing to encourage consumers to use their temporary transactional accounts to shop with the a particular merchant in return for the merchant's agreement to provide discounts to consumers who shop with a temporary transactional account access device imprinted with the merchant's logo or insignia and/or assigning merchant-specific promotions to specifically issued temporary transactional account access devices via printing on the access devices.

Other promotions in connection with the temporary transactional account access device include, for example, adding promotions or discounts to pre-determined temporary transactional account access devices based on targeting criteria specified by a merchant or bank, adding promotions or discounts to pre-determined temporary transactional account access devices based on random assignment as a type of prize for the consumer, and/or providing exploding coupons with dynamic pricing in which consumers are offered a discount by the financial institution and/or one or more of the merchants on all purchases made with pre-determined temporary transactional account access devices within a certain communicated pre-determined time frame.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 2 is a table that illustrates examples of a consumer's payment options for the temporary transactional account for an embodiment of the invention;

FIG. 3 is a table that illustrates an example of promotions with the temporary transactional access device for an embodiment of the invention.

DETAILED DESCRIPTION

Figure 1:
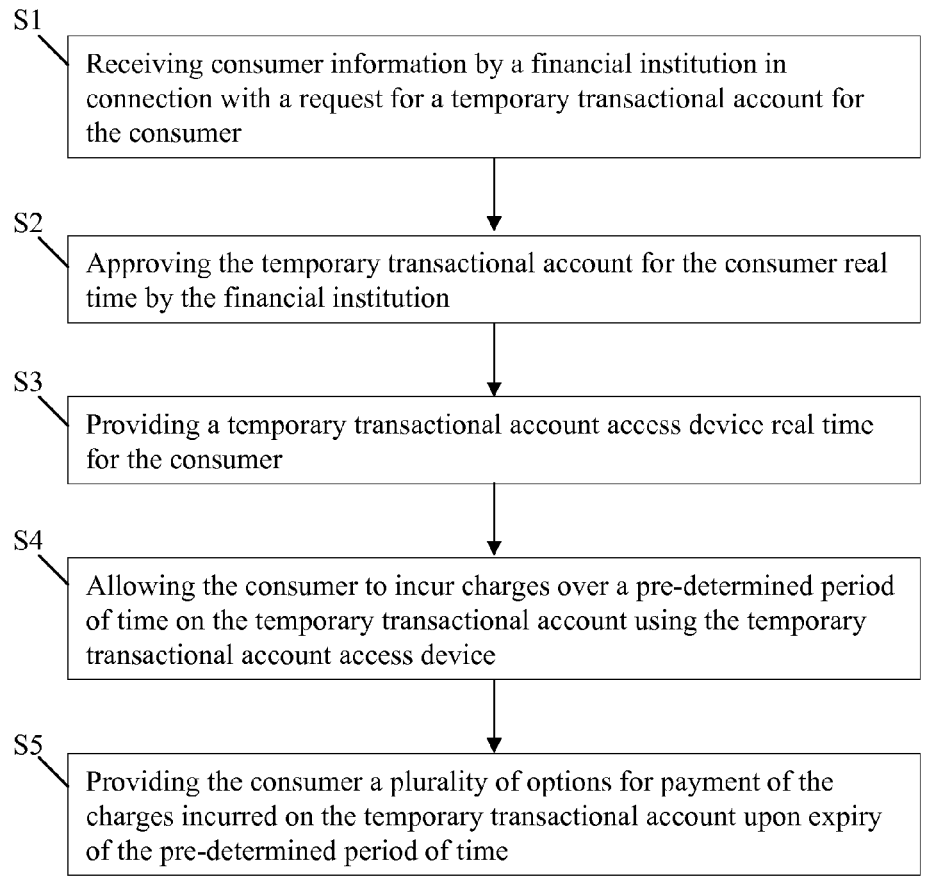
FIG. 1 is a flow chart that illustrates an example of the process of providing a temporary transactional account for a consumer for an embodiment of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 is a flow chart that illustrates an example of the process of providing a temporary transactional account for a consumer for an embodiment of the invention. Referring to FIG. 1, at S1, consumer information is received by a financial institution in connection with a request for a temporary transactional account for the consumer. At S2, the financial institution approves the temporary transactional account for the consumer real time, and at S3, the financial institution provides a temporary transactional account access device real time for the consumer. Thereafter, at S4, the consumer is allowed to incur charges over a pre-determined period of time on the temporary transactional account using the temporary transactional account access device, and at S5, the consumer is provided with a plurality of options for payment of the charges incurred on the temporary transactional account upon expiry of the pre-determined period of time.

An aspect of the present invention involves providing a consumer a temporary transactional account with or without an access device that issues instantly utilizing technology, such as computer hardware and software. The access device can be made, for example, of a plastic material, such as polyethylene terraphthalate (PET) which is a thin, flexible material used, for example, for Metro Cards in the New York City transit system. While any other suitable material can be used for an embodiment of the invention, the flexible nature of PET gives it a disposable look and feel that underscores the temporary, disposable aspect of the payment product for an embodiment of the invention.

In an embodiment of the invention, access devices, such as temporary cards, representing relatively small transactional accounts can be issued, for example, through strategically placed kiosks. In operation, a consumer approaches such a kiosk and enters certain information about himself or herself, such as by typing in the information on a keyboard component of the kiosk or by dipping his or her magnetic stripe or bar code-equipped driver's license in a card reader component of the kiosk. In this regard, it is noted that 48 out of 51 U.S. driver's licenses (including Washington, D.C.) issued today are provided with either a bar code or a magnetic stripe.

According to embodiments of the invention, when the consumer dips his or her driver's license in the card reader of the kiosk, relevant data is read, for example, from the magnetic stripe and sent from the kiosk to a financial institution, such as a bank. Upon receipt of the consumer's data, the financial institution performs a quick risk assessment and risk profiling and quickly reaches a decision resulting in immediate dispensing of the temporary credit card to the consumer out of the kiosk.

As an alternative to use of the consumer's driver's license for securing information about the consumer, in embodiments of the invention, if the consumer is an existing customer of a financial institution, he or she can enter his or her account or other identification information via the keyboard at the kiosk or dip his or her credit card, debit card or other type of financial institution transaction card in the card reader of the kiosk. Those sources of information are exemplary only and are not intended to be exclusive. It is to be understood that any type of identification that links the consumer back into the financial institution database for identification purposes can be used as well. In response to prompts, the consumer enters other authentication information, and a verification is performed automatically by a backend system of the financial institution.

An aspect of the invention allows the consumer an opportunity to customize the access device, such a card, at the kiosk. The consumer can customize the appearance of the temporary card, for example, by choosing from among various text and graphic artwork options or potentially from enabling photo capture capabilities on the kiosk to incorporate an image onto the access device design. Thus, for a consumer who wishes to specify certain spending for certain events, such as holiday gift shopping, the consumer can dedicate his or her access device solely to holiday spending and select holiday artwork and text, such as "Christmas Shopping". Thus, the access device, such as a card, is issued, for example, with a line of credit for the consumer, as well as the consumer's chosen artwork on it. The access device may also be personalized with the cardholder's name, account number, card expiration date and/or any other relevant account or security-related data.

In an embodiment of the invention, the account is automatically closed at the end of a certain period of time, such as three months, which again emphasizes the temporary nature of the account for a consumer. For example, the consumer secures an account in October and by the end of December the account is automatically closed. It simply expires, so the consumer does not need to be concerned with the account any longer. At that point, the amount that has been charged on the account by the consumer becomes the set principal for the consumer to repay to the financial institution. Thus, at the end of three months, the financial institution sends an invoice to the consumer with several options for payment.

FIG. 2 is a table that illustrates examples of a consumer's payment options for the temporary transactional account for an embodiment of the invention. One such option 20 allows the consumer to pay the principal balance of the invoice in full with no interest charged on the principal. Alternatively, the consumer can elect an option 22 to pay the principal balance in installments, for example, over three months, six months or twelve months plus interest. Further, instead of sending one or more checks in payment, the consumer can elect an option 24 to authorize the financial institution to draft the consumer's checking account through an ACH payment. Consumers who contemplate, for example, using a succession of temporary accounts can also select an option 26 for the financial institution to store their checking account information, so their account can be debited for payment of succeeding charges. Another option 28 for consumers who have an existing financial institution credit card, for example, is to have their temporary account charges rolled over into their existing financial institution credit card account. Alternatively, the consumer can elect an option 30 for the temporary account to be converted into a new, more permanent, traditional credit card account with associated traditional card plastic.

It is to be further understood that embodiments of the invention are not limited to access devices, such as cards made of plastic such as PET, but can utilize, for example, access devices made of paper or any other suitable material. Nor are embodiments of the invention limited to use of cards but can include other suitable media as well. Likewise, embodiments of the invention are not limited to use of kiosks. For example, consumers can be provided access devices, such as cards, in advance that are not activated for use, and from time to time, when a consumer wants to use one of the access devices, for example, for holiday shopping or wedding gifts or has a tax refund on the way, the consumer can activate one of the access devices for such uses.

Again, the distribution channel for embodiments of the invention is not limited to a kiosk. Nor is the access device for an embodiment of an invention limited to a card with a magnetic stripe or bar code. While the access device can also be embodied, for example, in a smart card, it is likewise not limited to a card. Rather, embodiments of the invention include the concept of opening a temporary transaction account and positioning its use around specific events, closing the temporary transaction account, and thereafter providing an option 32 on the backend that include fixed payments that allow consumers to pay off the balance within a specific period of time either in full or via revolving credit as shown in FIG. 2.

Further, embodiments of the invention are not limited to use of access devices of any type. For example, the temporary transactional account can be represented simply by a number or alphanumeric designation. In one aspect, the number can be a regular credit card number that can be processed through a card processing system, such as the MasterCard or Visa systems. In another aspect, the number can be a private label type account number limited to one or more private label merchant customers of the financial institution. In a further aspect, the number can be implemented for use for a consortium of merchants.

An important aspect of embodiments of the invention is that at the end of a pre-determined period of time, such as three months, when a particular transaction account of a consumer expires, the principal balance is established, and there are no principal adjustments based on the amount charged on the temporary transaction account or otherwise. By definition, there is no adjustment in the principal balance, which is set once the particular account expires, so the consumer is assured of predictable monthly payments. Further, from a psychological perspective, a consumer is not in a situation of anticipating a monthly payment for a single purchase in the manner of an installment loan or auto loan. Rather, the principal balance on the temporary transaction account can typically represent purchases from multiple merchants at different times within the valid time period of the temporary account.

Referring again to FIG. 2, in embodiments of the invention, a consumer can elect an option 34, for example, to pay a portion of the balance and roll the remainder over to his or her existing credit card account with the financial institution. In one embodiment, the portion that is rolled over to the credit card account can be treated as a cash advance in the credit card account. In another embodiment, the rolled over portion can be treated as a purchase in the credit card account. Alternatively, a consumer who opens a temporary transactional account for a limited duration can choose to treat it more like a revolving credit account where there is a specified balance by which the consumer pays each month, and when the account is closed at the close of the limited duration period, the remaining balance is not actually transferred to a new account (i.e., rolled over), but instead the consumer can continue to actually just pay down that balance until it reaches zero.

A further aspect of embodiments of the invention involves, for example, selling space on the access devices to merchants. FIG. 3 is a table that illustrates an example of promotions with the temporary transactional access device for an embodiment of the invention. For example, analysis may disclose that certain consumers consistently use the temporary access devices at a particular merchant or that consumers who elect certain "personalization characteristics" may purchase goods/services at certain types of merchants (e.g., a "Christmas" picture may indicate purchases at apparel stores). Based on that information, the financial institution can approach that merchant, or a competitor of that particular merchant with a proposal 40 to encourage consumers to use their temporary accounts to shop with the one merchant or the other in return for the competitor's agreement to provide discounts to consumers who shop with a temporary access device imprinted, for example, with the merchant's logo or insignia.

Referring to FIG. 3, in another embodiment, merchant-specific promotions 42 can be assigned to specifically issued access devices via printing on the access devices. These promotions or discounts can be added to pre-determined ones 44 of the access devices based on targeting criteria specified by the merchant or bank or they can be assigned randomly 46, as a type of prize for the consumer. Still another aspect of embodiments of the invention utilizes, for example, "exploding coupons" 48 with dynamic pricing in which consumers are offered a discount by the financial institution and/or one or more of the merchants on all purchases made with the temporary transactional account within a certain communicated time frame. Thus, a consumer who has a choice of using his or her existing credit card without a discount or using the temporary transactional account with a discount is motivated to use the temporary transaction account.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for managing consumer transactional accounts, comprising:

receiving consumer information by a first computer software application process executing on a financial institution database computer hardware device in connection with a request for a temporary transactional account for the consumer;

approving the temporary transactional account for the consumer real time by a second computer software application process executing on a financial institution backend system computer hardware device;

providing a non-physical temporary transactional account access device real time for the consumer by a third computer software application process executing on the financial institution backend system computer hardware device;

accumulating consumer charges by a fourth computer software application process executing on the financial institution backend system computer hardware device incurred over a pre-determined period of time on the temporary transactional account using the non-physical temporary transactional account access device without sending an invoice to the consumer and without accruing interest on the temporary transactional account during the pre-determined period of time and thereafter sending an invoice to the consumer for the charges incurred on the transactional account during the pre-determined period of time and commencing accrual of interest on the accumulated charges upon expiry of the pre-determined period of time, wherein said pre-determined period of time is at least a plurality of months; and providing the consumer a plurality of options by a fifth computer software application process executing on the financial institution backend system computer hardware device for payment of the charges incurred on the temporary transactional account upon expiry of the predetermined period of time.

2. The method of claim 1, wherein receiving the consumer information further comprises receiving the consumer information entered on a keyboard component of a computer terminal.

3. The method of claim 1, wherein receiving the consumer information further comprises receiving the consumer information entered by reading relevant consumer data from a magnetic stripe-equipped driver's license dipped in a card reader component of a computer terminal.

4. The method of claim 1, wherein receiving the consumer information further comprises receiving the consumer information entered by reading relevant consumer data from a bar code-equipped driver's license dipped in a card reader component of a computer terminal.

5. The method of claim 1, wherein receiving the consumer information further comprises receiving consumer identification information that links the consumer who is an existing customer of the financial institution back into the financial institution database for identification purposes.

6. The method of claim 1, wherein approving the temporary transactional account further comprises performing a real time risk assessment and risk profiling of the consumer by the financial institution.

7. The method of claim 1, wherein approving the temporary transactional account further comprises performing a real time verification of the consumer who is an existing customer of the financial institution automatically by the backend system of the financial institution.

8. The method of claim 1, wherein providing the non-physical temporary transactional account access device further comprises issuing the non-physical temporary transactional account access device with a temporary line of credit for the consumer.

9. The method of claim 1, wherein providing the non-physical temporary transactional account access device further comprises issuing the non-physical temporary transactional account access device real time for the consumer via a computer terminal.

10. The method of claim 1, further comprising providing the consumer an option to dedicate the non-physical temporary transactional account access device solely to a pre-selected spending category.

11. The method of claim 1, wherein issuing the non-physical temporary transactional account access device real time for the consumer further comprises issuing an inactive non-physical temporary transactional account access device real time that can be activated for use by the consumer on a subsequent occasion.

12. The method of claim 1, wherein providing the non-physical temporary transactional account access device further comprises providing the non-physical temporary transactional account access device real time consisting of a numeric designation.

13. The method of claim 1, wherein providing the non-physical temporary transactional account access device further comprises providing the non-physical temporary transactional account access device real time consisting of an alphanumeric designation.

14. The method of claim 1, wherein providing the non-physical temporary transactional account access device further comprises providing the non-physical temporary transactional account access device real time consisting of a pseudo-credit card number that can be processed through a card issuer's card processing system.

15. The method of claim 1, wherein providing the non-physical temporary transactional account access device further comprises providing the non-physical temporary transactional account access device real time consisting of a private label type account number limited to at least one private label merchant consumer of the financial institution.

16. The method of claim 1, wherein providing the non-physical temporary transactional account access device further comprises providing the non-physical temporary transactional account access device real time consisting of an account number implemented for use for a consortium of merchants.

17. The method of claim 1, further comprising automatically closing the temporary transactional account upon expiry of the pre-determined period of time.

18. The method of claim 1, wherein said pre-determined period of time is at least a three months period of time.

19. The method of claim 1, wherein providing the consumer the plurality of options for payment of the charges incurred on the temporary transactional account further comprises sending the invoice to the consumer with payment options for at least one of an option that allows the consumer to pay a principal balance of the invoice in full with no interest charged on the principal balance, an option that allows the consumer to elect to pay the principal balance in installments over a pre-selected period of time plus interest, an option that allows the consumer to authorize the financial institution to draft the consumer's checking account through an ACH payment, an option in which the financial institution stores the consumer's checking account information for debiting the consumer's checking account for payment of succeeding charges, an option for a consumer who has an existing financial institution credit card to have the consumer's temporary transactional account charges rolled over into the consumer's existing financial institution credit card account, an option in which the temporary transactional account is converted into a new, permanent credit card account, an option that allows the consumer to pay the balance of the temporary transactional account in fixed installments within a pre-specified period of time via one of payment in full and revolving credit, and an option that allows the consumer to elect to pay a portion of the balance of the temporary transactional account and roll a remainder over to the consumer's existing credit card account with the financial institution.

20. The method of claim 19, wherein the option that allows the consumer to elect to pay a portion of the balance of the temporary transactional account and roll the remainder over to the consumer's existing credit card account with the financial institution further comprises an option that allows the consumer to have a portion of the balance of the temporary transactional account that is rolled over to the credit card account as a cash advance in the credit card account.

21. The method of claim 19, wherein the option that allows the consumer to elect to pay a portion of the balance of the temporary transactional account and roll the remainder over to the consumer's existing credit card account with the financial institution further comprises an option that allows the consumer to have a portion of the balance of the temporary transactional account that is rolled over to the credit card account as a purchase in the credit card account.

22. The method of claim 1, further comprising providing promotions in connection with the non-physical temporary transactional account access device.

23. The method of claim 22, wherein providing promotions in connection with the non-physical temporary transactional account access device further comprises at least one of agreeing by the financial institution to encourage consumers to use their non-physical temporary transactional accounts to shop with the a particular merchant, assigning merchant-specific promotions to specifically issued non-physical temporary transactional account access devices, providing at least one of promotions and discounts in connection with pre-determined nonphysical temporary transactional account access devices based on targeting criteria specified by a merchant, providing at least one of promotions and discounts in connection with pre-determined non-physical temporary transactional account access devices based on random assignment as a type of prize for consumers, and providing exploding coupons with dynamic pricing in which consumers are offered a discount by the financial institution and at least one merchant on purchases made with pre-determined non-physical temporary transactional account access devices within a certain communicated pre-determined time frame.

24. A non-transitory machine-readable medium on which is encoded program code executable by a computer hardware device for managing consumer transactional accounts, the program code comprising instructions for:
   receiving consumer information by a first computer software application process executing on a financial institution database computer hardware device in connection with a request for a temporary transactional account for the consumer;
   approving the temporary transactional account for the consumer real time by a second computer software application process executing on a financial institution backend system computer hardware device;
   providing a non-physical temporary transactional account access device real time for the consumer by a third computer software application process executing on the financial institution backend system computer hardware device;
   accumulating consumer charges by a fourth computer software application process executing on the financial institution backend system computer hardware device incurred over a pre-determined period of time on the temporary transactional account using the non-physical temporary transactional account access device without sending an invoice to the consumer and without accruing interest on the temporary transactional account during the pre-determined period of time and thereafter sending an invoice to the consumer for the charges incurred on the transactional account during the pre-determined period of time, and commencing accrual of interest on the accumulated charges upon expiry of the pre-determined period of time, wherein said pre-determined period of time is at least a plurality of months; and
   providing the consumer a plurality of options by a fifth computer software application process executing on the financial institution backend system computer hardware device for payment of the charges incurred on the temporary transactional account upon expiry of the predetermined period of time.

25. A computer-implemented system for managing consumer transactional accounts, comprising:
   a first computer software application process executing on a financial institution computer hardware database device that receives consumer information in connection with a request for a temporary transactional account for the consumer;
   a second computer software application process executing on a financial institution backend system computer hardware device that approves the temporary transactional account for the consumer real time;
   a third computer software application process executing on the financial institution backend system computer hardware device that provides a non-physical temporary transactional access device real time for the consumer;
   a fourth computer software application process executing on the financial institution backend system computer hardware device that accumulates consumer charges incurred over a pre-determined period of time on the temporary transactional account using the non-physical temporary transactional account access device without sending an invoice to the consumer and without accruing interest on the temporary transactional account during the pre-determined period of time and thereafter sends an invoice to the consumer for the charges incurred on the transactional account during the pre-determined period of time and commences accrual of interest on the accumulated charges upon expiry of the pre-determined period of time, wherein said pre-determined period of time is at least a plurality of months a fifth computer software application process executing on the financial institution backend system computer hardware device that provides the consumer a plurality of options for payment of the charges incurred on the temporary transactional account upon expiry of the predetermined period of time.

\* \* \* \* \*